United States Patent
Maeda et al.

(10) Patent No.: US 6,957,590 B2
(45) Date of Patent: Oct. 25, 2005

(54) ROTATIONAL ANGLE DETECTING APPARATUS AND TORQUE DETECTING APPARATUS

(75) Inventors: Naoki Maeda, Kashiwara (JP); Masami Naka, Yamatotakada (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/786,064

(22) Filed: Feb. 26, 2004

(65) Prior Publication Data

US 2004/0168524 A1 Sep. 2, 2004

(30) Foreign Application Priority Data

Feb. 28, 2003 (JP) ........................................ 2003-054893

(51) Int. Cl.[7] ................................................ G01L 3/02
(52) U.S. Cl. ................................................. 73/862.334
(58) Field of Search ..................... 73/862.331, 862.332, 73/862.333, 862.334, 862.335, 862.336

(56) References Cited

U.S. PATENT DOCUMENTS

| | | | | |
|---|---|---|---|---|
| 4,750,371 A | * | 6/1988 | Kobayashi et al. | .... 73/862.336 |
| 4,764,767 A | * | 8/1988 | Ichikawa et al. | ...... 340/870.31 |
| 5,675,095 A | * | 10/1997 | Ballantyne | ............. 73/862.325 |

FOREIGN PATENT DOCUMENTS

| | | |
|---|---|---|
| JP | 5-62936 B2 | 9/1993 |
| JP | 9-189624 A | 7/1997 |
| JP | 2003-344188 A | 12/2003 |

* cited by examiner

*Primary Examiner*—Max Noori
(74) *Attorney, Agent, or Firm*—Birch, Stewart, Kolasch & Birch, LLP

(57) ABSTRACT

A calculation processing circuit 10 executes a predetermined operation on the detection signals of a plurality of magnetic sensors A and B, disposed to face a target 3a made of a magnetic material and provided on a rotating member 6, for outputting detection signals with mutually different phases according to a rotation of the rotating member 6, calculates the electrical angle of the detection signals based on a table 2a representing the correlation of the result of the operation executed in advance with a corresponding electrical angle of detection signals, and detects the rotational angle of the rotating member 6 based on the calculated electrical angle. The calculation processing circuit 10 stores a plurality of tables 2a through 2c for different gaps between the target 3a and the magnetic sensors A and B, determines the gap based on the detection signals of the magnetic sensors A and B, and calculates the electrical angle of the detection signals based on the table corresponding to the determined gap.

16 Claims, 11 Drawing Sheets

ROTATIONAL ANGLE DETECTING APPARATUS AND TORQUE DETECTING APPARATUS

BACKGROUND OF THE INVENTION

1. Field of the Invention

The present invention relates to a rotational angle detecting apparatus comprising: a plurality of detecting means, disposed to face one or a plurality of targets made of a magnetic material and provided on a rotating member, for detecting the target and outputting detection signals with mutually different phases according to the position of the target which changes with a rotation of the rotating member; operating means for operating a predetermined operation on the detection signals respectively outputted by the detecting means; and converting means for storing tables or conversion formulas, said tables representing the correlation of each operation result obtained by executing the predetermined operation by the operating means in advance with a corresponding electrical angle of the detection signals, and said conversion formulas representing the relationship between the operation result and the electrical angle of the detection signals, wherein the converting means calculates the electrical angle of the detection signals by converting the result of the operation executed by the operating means based on the table or the conversion formula, and detects the rotational angle of the rotating member based on the calculated electrical angle. And, the present invention relates to a torque detecting apparatus comprising this rotational angle detecting apparatus.

2. Description of Related Art

As a steering apparatus for automobiles, there is an electric power steering apparatus which reduces the driver's burden by assisting steering by driving an electric motor. This electric power steering apparatus comprises: an input shaft connected to a steering member (steering wheel); an output shaft connected to a drive wheel through a pinion, rack, etc.; a connection shaft connecting the input shaft and output shaft; and a torque sensor for detecting a steering torque applied to the input shaft, based on a torsional angle generated on the connection shaft, and drives and controls the steering assistant electric motor linked to the output shaft, based on the steering torque detected by the torque sensor.

The applicant of the present application in Japan proposes a rotational angle detecting apparatus comprising: a plurality of detecting means, disposed to face one or a plurality of targets made of a magnetic material provided on a rotating member, for outputting detection signals with mutually different phases according to the position of the target which changes with a rotation of the rotating member; operating means for operating a predetermined operation on the detection signals respectively outputted by the detecting means; storing means for storing the relationship between the result of the operation executed by the operating means in advance and the electrical angle of the detection signals, and means for converting the result of the operation executed by the operating means into the electrical angle of the detection signals with reference to the storing means, for detecting the rotational angle of the rotating member based on the obtained electrical angle, and also proposes a torque detecting apparatus comprising this rotational angle detecting apparatus in Japanese Patent Application Laid Open No. 2003-344188.

In the above-mentioned rotational angle detecting apparatus and torque detecting apparatus, since the relationship between the operation result and the electrical angle of the detection signals varies depending on the gap (space) between the target and a magnetic sensor (detecting means, such as an MR sensor or a hall sensor), the problem of operation errors will arise if these apparatuses cannot be mounted with the gap according to the design and if the run-out of the shaft of the target is large.

The above and further objects and features of the invention will more fully be apparent from the following detailed description with accompanying drawings.

BRIEF SUMMARY OF THE INVENTION

The present invention has been made with the aim of solving the above problem, and it is an object of the present invention to provide a rotational angle detecting apparatus capable of reducing the influence of the gap between the target and the detecting means even when the gap changes due to mounting errors, run-out of the shaft, etc.

It is also an object of the present invention to provide a torque detecting apparatus capable of reducing the influence of the gap between the target and the detecting means even when the gap changes due to mounting errors, run-out of the shaft, etc.

A rotational angle detecting apparatus according to the present invention is a rotational angle detecting apparatus comprising: a plurality of detecting means, disposed respectively to face one or a plurality of targets made of a magnetic material and provided on a rotating member, for detecting the target and outputting detection signals having phases according to position of the target which changes with a rotation of the rotating member; operating means for operating a predetermined operation on the detection signals respectively outputted by the detecting means; converting means for converting a result of the operation operated by the operating means into an electrical angle of the detection signals based on tables or conversion formulas, said tables representing the correlation of each operation result obtained by operating the predetermined operation by the operating means in advance with a corresponding electrical angle of the detection signals, and said conversion formulas representing the relationship between the operation result and the electrical angle of the detection signals, and detecting a rotational angle of the rotating member based on the obtained electrical angle, wherein the converting means stores a plurality of the tables or a plurality of the conversion formulas corresponding to different gaps between the target and the detecting means, the rotational angle detecting apparatus comprises determining means for determining the gap based on the detection signals respectively outputted from the detecting means, and the converting means converts the result of the operation operated by the operating means into the electrical angle of the detection signals based on the table or the conversion formula corresponding to the gap determined by the determining means, and detects a rotational angle of the rotating member based on the obtained electrical angle.

In this rotational angle detecting apparatus, the operating means executes a predetermined operation on detection signals respectively outputted by a plurality of detecting means, disposed respectively to face one or a plurality of targets made of a magnetic material and provided on a rotating member, for outputting detection signals with mutually different phases according to the position of the target which changes with a rotation of the rotating member. The converting means stores the tables or the conversion formulas, said tables representing the correlation of each operation result obtained by executing the predetermined operation by the operating means in advance with a corresponding electrical angle of the detection signals, and said conversion formulas representing the relationship between the operation result and the electrical angle of the detection signals. The converting means converts the result of the operation executed by the operating means into the electrical angle of the detection signals by using the table or the conversion formula, and detects the rotational angle of the rotating member based on the obtained electrical angle.

In this rotational angle detecting apparatus, the converting means stores a plurality of the tables or a plurality of the conversion formulas corresponding to different gaps between the target and the detecting means, determining means determines the gap between the target and the detecting means based on the detection signals respectively outputted by the detecting means, and the converting means converts the result of the operation into the electrical angle of the detection signals based on the table or conversion formula corresponding to the determined gap.

Accordingly, it is possible to realize the rotational angle detecting apparatus capable of reducing the influence of the gap between the target and the detecting means even when the gap changes due to mounting errors, run-out of the shaft, etc.

The rotational angle detecting apparatus according to the present invention is characterized by comprising: means for determining whether or not the gap determined by the determining means is one of the gaps corresponding to a plurality of the tables or a plurality of the conversion formulas; and calculating means for calculating the electrical angle of the detection signals by interpolation using two tables or two conversion formulas corresponding to two gaps on both sides of the gap determined by the determining means, if the determination result by the means is negative.

In this rotational angle detecting apparatus, it is determined whether or not the gap determined by the determining means is one of the gaps corresponding to a plurality of the tables or a plurality of the conversion formulas, and, if the determination result is negative, the electrical angle of the detection signals is calculated by interpolation using two tables or two conversion formulas corresponding to two gaps on both sides of the gap determined by the determining means.

Accordingly, even when the gap between the target and the detecting means changes due to mounting errors, run-out of the shaft, etc., it is possible to reduce the influence of the gap and reduce the tables or conversion formulas, and consequently it is possible to realize the rotational angle detecting apparatus capable of reducing the memory capacity.

The rotational angle detecting apparatus according to the present invention is characterized in that the calculating means calculates the electrical angle of the detection signals based on the operation results obtained by operating the predetermined operation by the operating means in advance for two gaps on both sides of the gap determined by the determining means, the electrical angles of the detection signals obtained by converting the operation results by converting means, and the result of the operation operated the predetermined operation on the detection signals respectively outputted from the detecting means by the operating means.

In this rotational angle detecting apparatus, the calculating means calculates the electrical angle of the detection signals based on the operation results, the electrical angles of the detection signals obtained by converting the operation results by using two tables or two conversion formulas corresponding to two gaps on both sides of the gap determined by the determining means, and an average operation result of the operation results.

Accordingly, even when the gap between the target and the detecting means changes due to mounting errors, run-out of the shaft, etc., it is possible to accurately detect the rotational angle of the rotating member.

A torque detecting apparatus according to the present invention is characterized by comprising the above-mentioned rotational angle detecting apparatus provided for each of a first shaft and a second shaft connected by a connection shaft; and detecting means for detecting a torque applied to the first shaft or the second shaft based on rotational angles of the first shaft and the second shaft detected by the rotational angle detecting apparatuses provided for the first shaft and the second shaft, respectively.

In this torque detecting apparatus, since detecting means detects a torque applied to the first shaft or the second shaft based on the rotational angles of the first shaft and second shaft detected by the rotational angle detecting apparatuses respectively provided for the first shaft and the second shaft connected by the connection shaft, it is possible to realize the torque detecting apparatus capable of reducing the influence of the gap between the target and the detecting means even when the gap changes due to mounting errors, run-out of the shaft, etc.

The above and further objects and features of the invention will more fully be apparent from the following detailed description with accompanying drawings.

DETAILED DESCRIPTION OF THE INVENTION

The following description will explain the present invention, based on the drawings illustrating an embodiment thereof.

Figure 1:
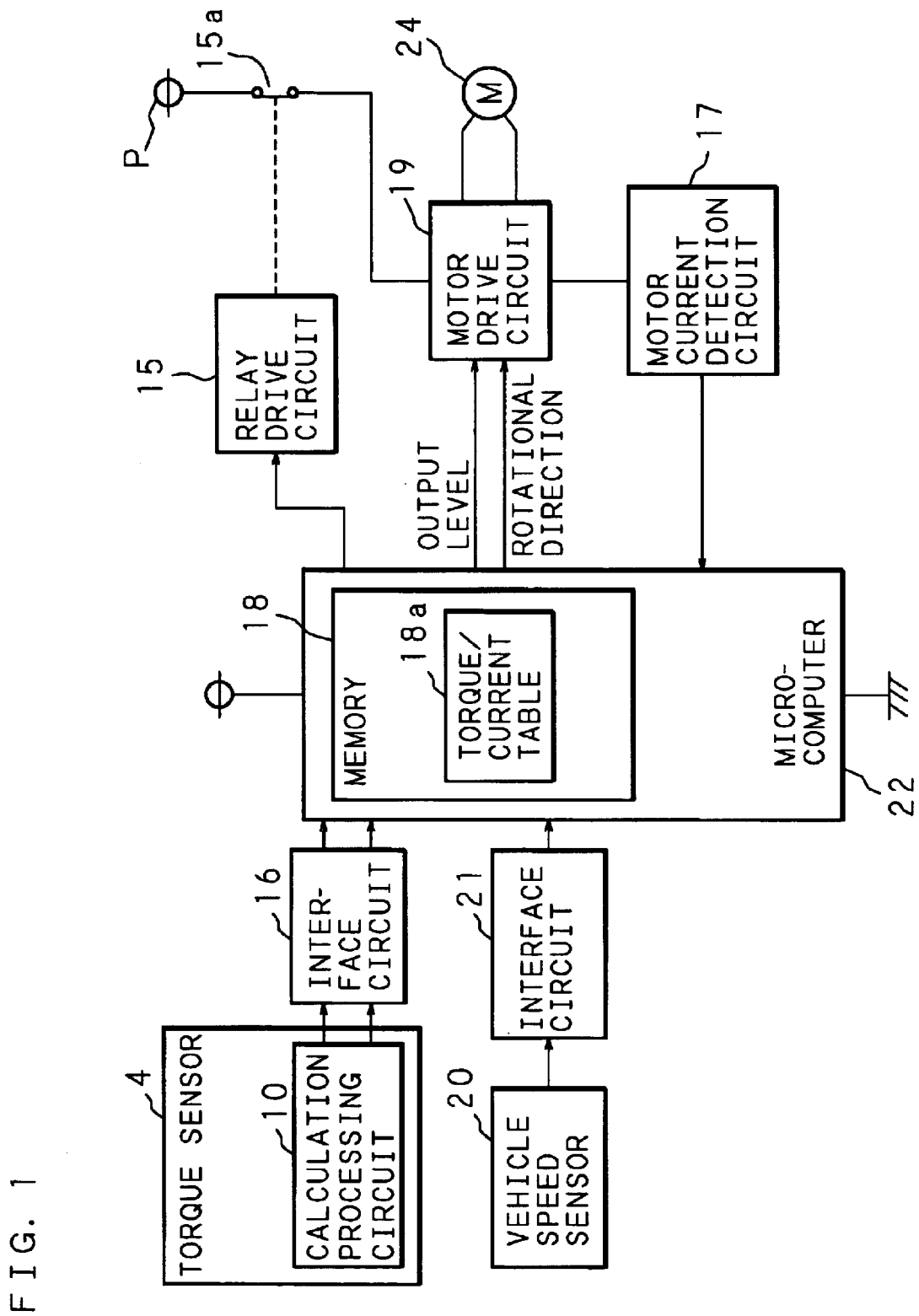
FIG. 1 is a block diagram showing the essential structures of an electric power steering apparatus comprising a rotational angle detecting apparatus and a torque detecting apparatus according to an embodiment of the present invention.

FIG. 1 is a block diagram showing the essential structures of an electric power steering apparatus comprising a rotational angle detecting apparatus and a torque detecting apparatus according to an embodiment of the present invention. In this electric power steering apparatus, a torque value and an absolute steering angle detected by a torque sensor 4 (torque detecting apparatus) for detecting a torque applied to a steering shaft (not shown) are inputted to a micro-computer 22 from a calculation processing circuit 10 in the torque sensor 4 through an interface circuit 16.

A detection signal of a vehicle speed sensor 20 for detecting a vehicle speed is inputted to the micro-computer 22 through an interface circuit 21.

A relay control signal outputted from the micro-computer 22 is inputted to a relay drive circuit 15, and the relay drive circuit 15 turns on or off a fail-safe relay 15a according to the relay control signal.

The micro-computer 22 creates motor control signals with reference to a torque/current table 18a in a memory 18 based on the torque value, vehicle speed, absolute steering angle and later-described motor current, and inputs the created motor control signals (output level, rotational direction) to a motor drive circuit 19. The motor drive circuit 19 rotates and drives a steering assistant motor 24 based on the inputted motor control signals.

The motor current of the steering assistant motor 24 flowing in the motor drive circuit 19 is detected by a motor current detection circuit 17 and inputted to the micro-computer 22.

Figure 2:
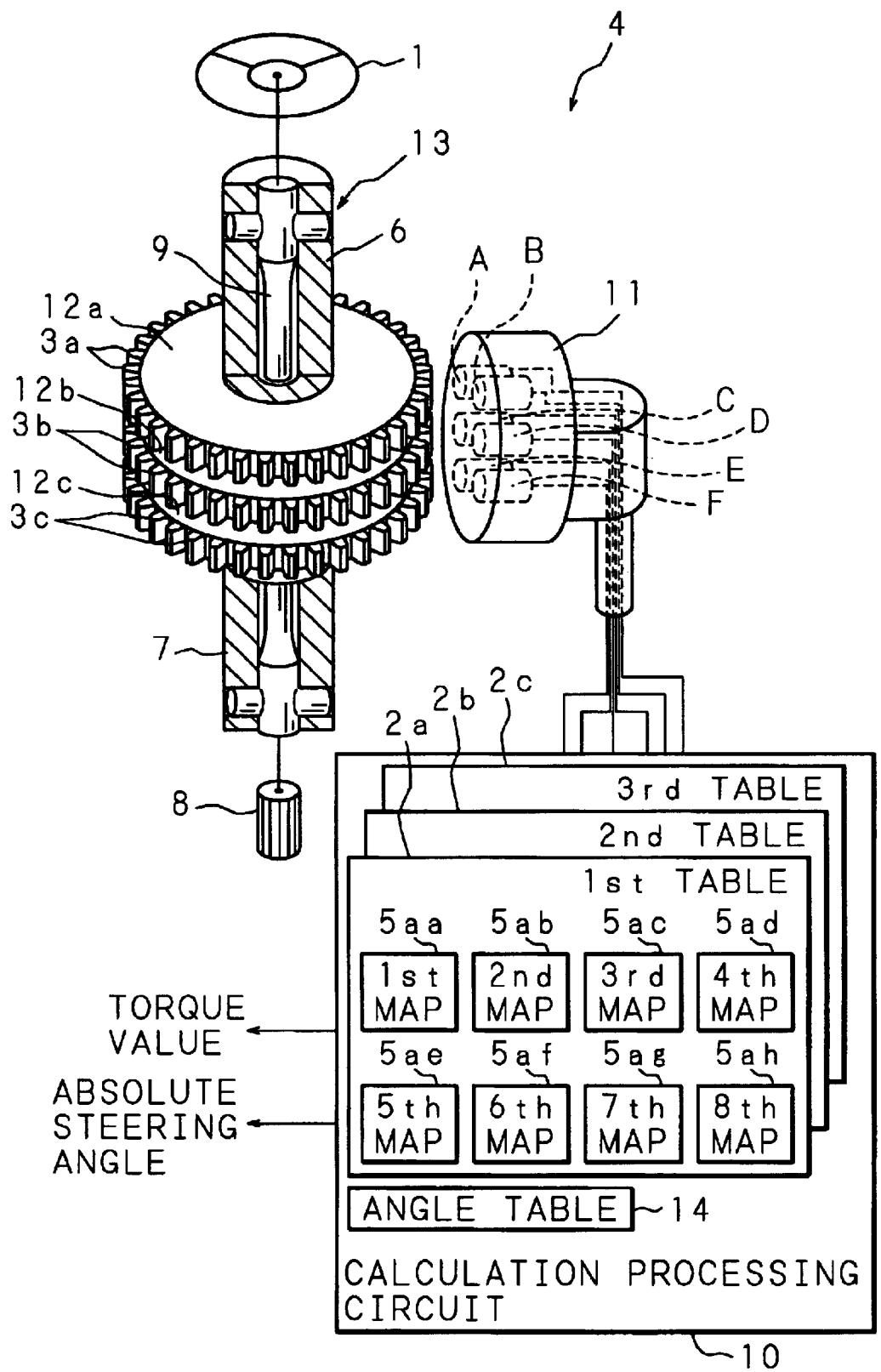
FIG. 2 is a schematic view showing schematically an example of the structure of a torque sensor.

FIG. 2 is a schematic view showing schematically an example of the structure of the torque sensor 4. This torque sensor 4 comprises a steering shaft 13 for connecting a steering member (handle) 1 and a steering mechanism. The steering shaft 13 is constructed by coaxially connecting an input shaft 6 (rotating member, first shaft) having an upper end connected to the steering member 1 and an output shaft 7 (rotating member, second shaft) having a lower end connected to a pinion 8 of the steering mechanism through a torsion bar 9 (connection shaft) with a small diameter. The vicinity of the connected section of the input shaft 6 and output shaft 7 is constructed as follows.

A disc-shaped target plate 12a (rotating member) is coaxially fitted and secured on the input shaft 6 in the vicinity of one end connected to the output shaft 7. On the outer circumferential surface of the target plate 12a, for example, 37 targets 3a which are protrusions made of a magnetic material are provided at equal intervals in the circumferential direction. The targets 3a form the teeth of a spur gear, and the target plate 12a and targets 3a form a ring-shaped spur gear.

Disc-shaped target plates 12b and 12c (rotating members) are coaxially fitted and secured on the output shaft 7 in the vicinity of one end connected to the input shaft 6 so that the target plate 12b is located on the input shaft 6 side. On the outer circumferential surface of the target plate 12c, 37 targets 3c which are protrusions made of a magnetic material and the same number as the targets 3a are provided at equal intervals in the circumferential direction to align with the targets 3a. On the outer circumferential surface of the target plate 12b, a number of, for example, 36 targets 3b which are protrusions made of a magnetic material are provided at equal intervals in the circumferential direction. The number of the targets 3b and the number of the targets 3c are mutually prime. Here, "mutually prime" means that the two numbers do not have a common divisor other than 1.

The targets 3b and 3c form the teeth of spur gears, respectively, and the target plate 12b and targets 3b, and the target plate 12c and targets 3c, form ring-shaped spur gears, respectively.

A sensor box 11 is disposed outside the target plates 12a, 12b and 12c so that it faces the outer edges of the targets 3a, 3b and 3c on the outer circumference of the respective target plates 12a, 12b and 12c. The sensor box 11 is fixedly supported on a stationary portion, such as a housing (not shown) that supports the input shaft 6 and the output shaft 7. Magnetic sensors A and B (detecting means) facing different portions in the circumferential direction of the targets 3a on the input shaft 6 side and magnetic sensors E and F (detecting means) facing different portions in the circumferential direction of the targets 3c on the output shaft 7 side are stored in the sensor box 11 so that their positions in the circumferential direction are correctly aligned. Magnetic sensors C and D (detecting means) facing different portions in the circumferential direction of the targets 3b on the output shaft 7 side are stored in the sensor box 11.

The magnetic sensors A, B, C, D, E, and F are sensors constructed using elements having an electrical characteristic (resistance) which changes due to the action of a magnetic field, such as a magnetoresistance effect element (MR element), so that the detection signals thereof vary depending on portions close to the facing targets 3a, 3b and 3c. The detection signals of these sensors are inputted to the calculation processing circuit 10 composed of a micro-processor placed outside or inside the sensor box 11.

The calculation processing circuit 10 stores an angle table 14 that associates the absolute angle of rotation of the output shaft 7 with corresponding $\theta_{CD}$ and $\theta_{EF}$ (electrical angles of the targets 3b and 3c after operation).

The calculation processing circuit 10 stores a 1st table 2a, a 2nd table 2b and a 3rd table 2c representing the correlation of the results of a predetermined operation executed on the respective detection signals of the magnetic sensors A, B, C and D actually measured in advance, such as at the time of shipment from the factory, with the corresponding electrical angles of the respective detection signals. The 1st table 2a, 2nd table 2b, and 3rd table 2c are actually measured by respectively changing the gaps between the targets 3a, 3b and the magnetic sensors A, B, C, D.

The gap between the target 3a and the magnetic sensors A, B is the average between the shortest distance between the target 3a and magnetic sensor A and the shortest distance between the target 3a and magnetic sensor B. Similarly, the gap between the target 3b and the magnetic sensors C, D is the average between the shortest distance between the target 3b and magnetic sensor C and the shortest distance between the target 3b and magnetic sensor D.

The 1st table 2a, 2nd table 2b, and 3rd table 2c have 1st map 5aa through 4th map 5ad, 1st map 5ba through 4th map 5bd, and 1st map 5ca through 4th map 5cd, respectively, storing the relationship between the results of the predetermined operation executed on the respective detection signals of the magnetic sensors A, B and the electrical angle of the respective detection signals. The 1st map 5aa through 4th map 5ad, the 1st map 5ba through 4th map 5bd, and the 1st map 5ca through 4th map 5cd can also be applied to the relationship between the results of the predetermined operation executed on the respective detection signals of the magnetic sensors E, F and the electrical angle of the respective detection signals.

The 1st table 2a, 2nd table 2b, and 3rd table 2c have 5th map 5ae through 8th map 5ah, 5th map 5be through 8th map 5bh, and 5th map 5ce through 8th map 5ch, respectively, storing the relationship between the results of the predetermined operation executed on the respective detection signals of the magnetic sensors C, D and the electrical angle of the respective detection signals.

The magnetic sensors A, B, C, D, E and F output detection signals approximate to sine waves with the passage of the respective targets 3a, 3b and 3c. Although these detection signals show a maximum rate of nonlinear change near the transition from rise to fall, or from fall to rise, they can be interpolated by the following signal processing method.

Figure 3A:
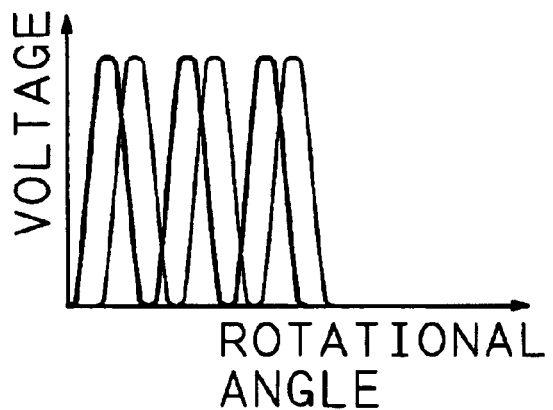
FIG. 3A, FIG. 3B and FIG. 3C are waveform charts showing examples of detection signals of magnetic sensors.
Figure 3B:
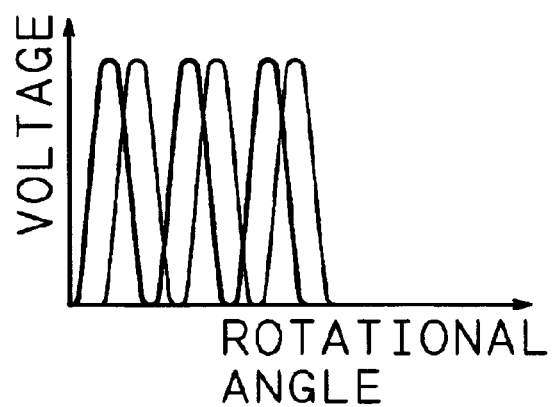
Figure 3C:
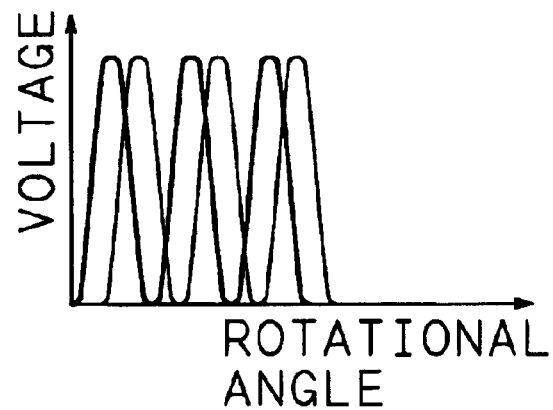

In the torque sensor 4 with such a structure, the magnetic sensors A, B, C, D, E and F output detection signals that rise and fall according to change in the respective rotational angles of the input shaft 6 and output shaft 7 as shown in FIG. 3A, FIG. 3B and FIG. 3C while the corresponding targets 3a, 3b and 3c are passing through the position facing their sensors.

The detection signals of the magnetic sensors A and B correspond to the rotational angle of the input shaft 6 on which the targets 3a corresponding to these magnetic sensors A and B are provided, the detection signals of the magnetic sensors C and D correspond to the rotational angle of the output shaft 7 on which the targets 3b corresponding to these magnetic sensors C and D are provided, and the detection signals of the magnetic sensors E and F correspond to the rotational angle of the output shaft 7 on which the targets 3c facing to these magnetic sensors E and F are provided.

Accordingly, the calculation processing circuit 10 can calculate the relative rotational angle of the input shaft 6 from the detection signals of the magnetic sensors A and B, and the calculation processing circuit 10 and magnetic sensors A, B operate as a rotational angle detecting apparatus for the input shaft 6. Similarly, the calculation processing circuit 10 can calculate the relative rotational angle of the output shaft 7 from the detection signals of the magnetic sensors E and F, and the calculation processing circuit 10 and magnetic sensors E, F operate as a rotational angle detecting apparatus for the output shaft 7.

When a torque is applied to the input shaft 6, a difference occurs between the detection signals of the magnetic sensors A, B and the detection signals of the magnetic sensors E, F.

The magnetic sensors A and E and the magnetic sensors B and F output detection signals with a phase difference of, for example, 90° in the electrical angle in the circumferential direction of the target plates 12a and 12c. The rate of nonlinear change reaches a maximum at the maximum and minimum values of the detection signals, which are the transition points to rise or fall. However, since the detection signals have different phases, they can be mutually interpolated. If interpolation is possible, the angle of the phase difference may have any electrical angle between 1° and less than 360°.

Here, the difference between the detection signal of the magnetic sensor A and the detection signal of the magnetic sensor E, or the difference between the detection signal of the magnetic sensor B and the detection signal of the magnetic sensor F, corresponds to the difference in the rotational angles between the input shaft 6 and output shaft 7 (relative angular displacement). This relative angular displacement corresponds to the torsional angle generated on the torsion bar 9 connecting the input shaft 6 and output shaft 7, under the action of the torque applied to the input shaft 6. Therefore, it is possible to calculate the torque applied to the input shaft 1 based on the above-mentioned difference between the detection signals.

Similarly to the magnetic sensors E and F, the magnetic sensors C and D output detection signals with a phase difference of, for example, 90° in the electrical angle in the circumferential direction of the target plate 12b. However, while the number of the targets 3c facing the magnetic sensors E and F is 37, the number of the targets 3b facing the magnetic sensors C and D is 36. Therefore, as shown in FIG. 4, the magnetic sensors E, C and the magnetic sensors F, D output detection signals whose phases mutually shift by 1/37 phase every time the output shaft 7 is rotated by one phase.

Figure 4:
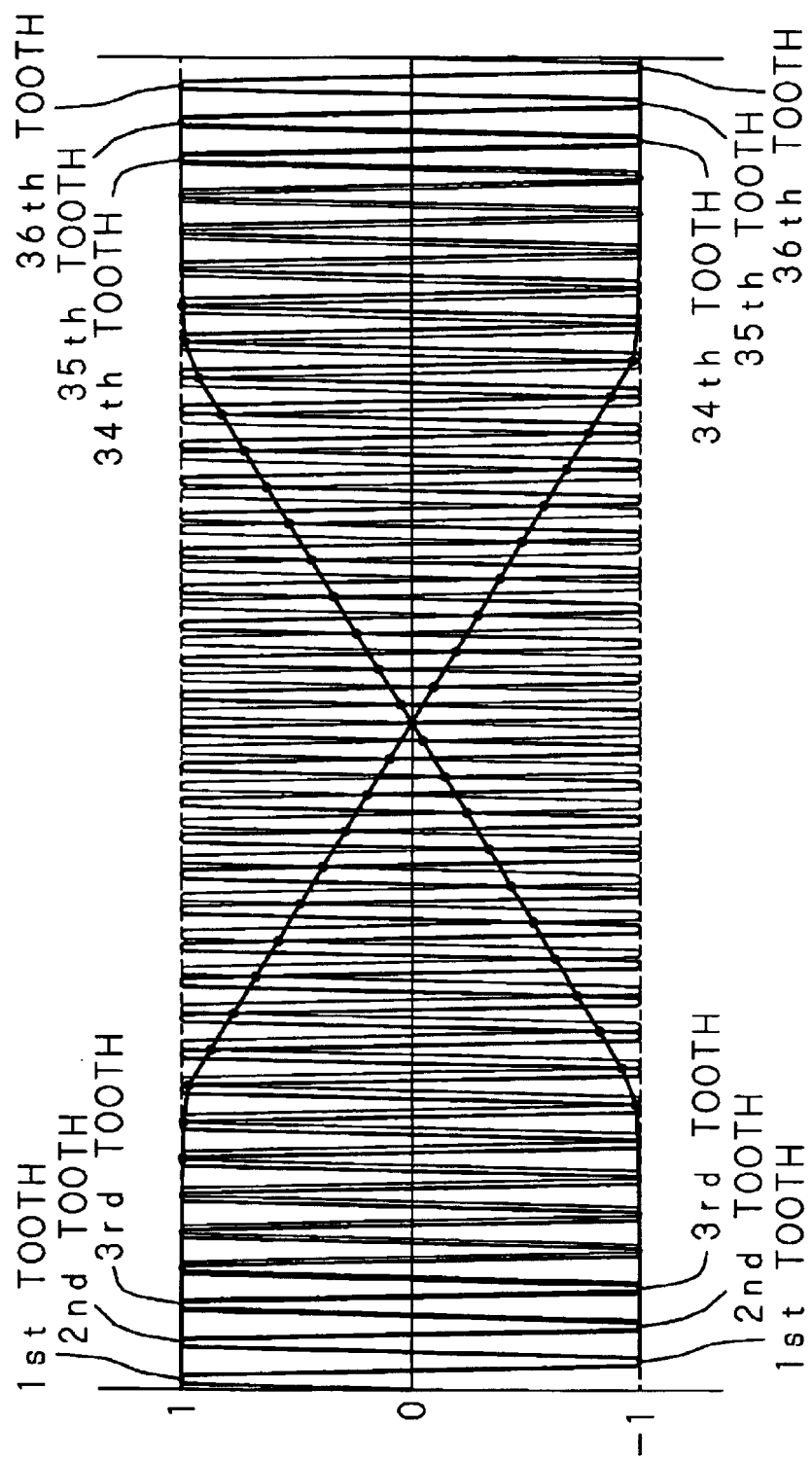
FIG. 4 is a waveform chart showing examples of detection signals of magnetic sensors facing different numbers of targets.

Regarding only the magnetic sensors E, C, or only the magnetic sensors F, D, as shown in FIG. 4, since a pair of the same detection signal values appear twice while the output shaft 7 is rotating 360°, it is impossible to specify the rotational angle (absolute rotational angle) of the output shaft 7. However, with reference to $\theta_{CD}$ and $\theta_{EF}$ (the electrical angles of the targets 3b and 3c) in the angle table 14, it is possible to specify the rotational angle of the output shaft 7.

With reference to the flowcharts of FIG. 5, FIG. 6, FIG. 8, FIG. 10 and FIG. 11, the following description will explain the operation of an electric power steering apparatus having such structures.

Figure 5:
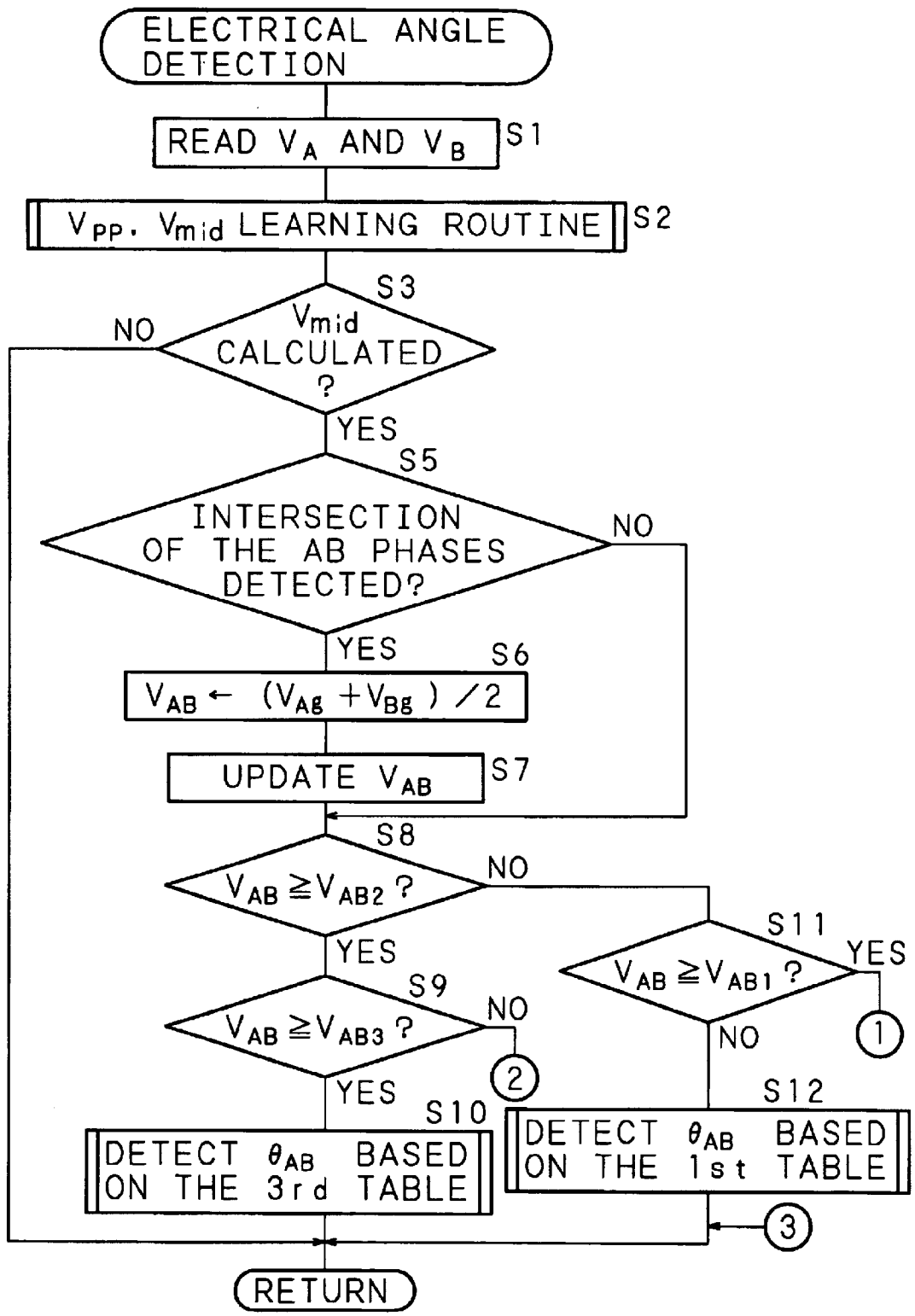
FIG. 5 is a flowchart showing the operation of an calculation processing circuit of the electric power steering apparatus.
Figure 6:
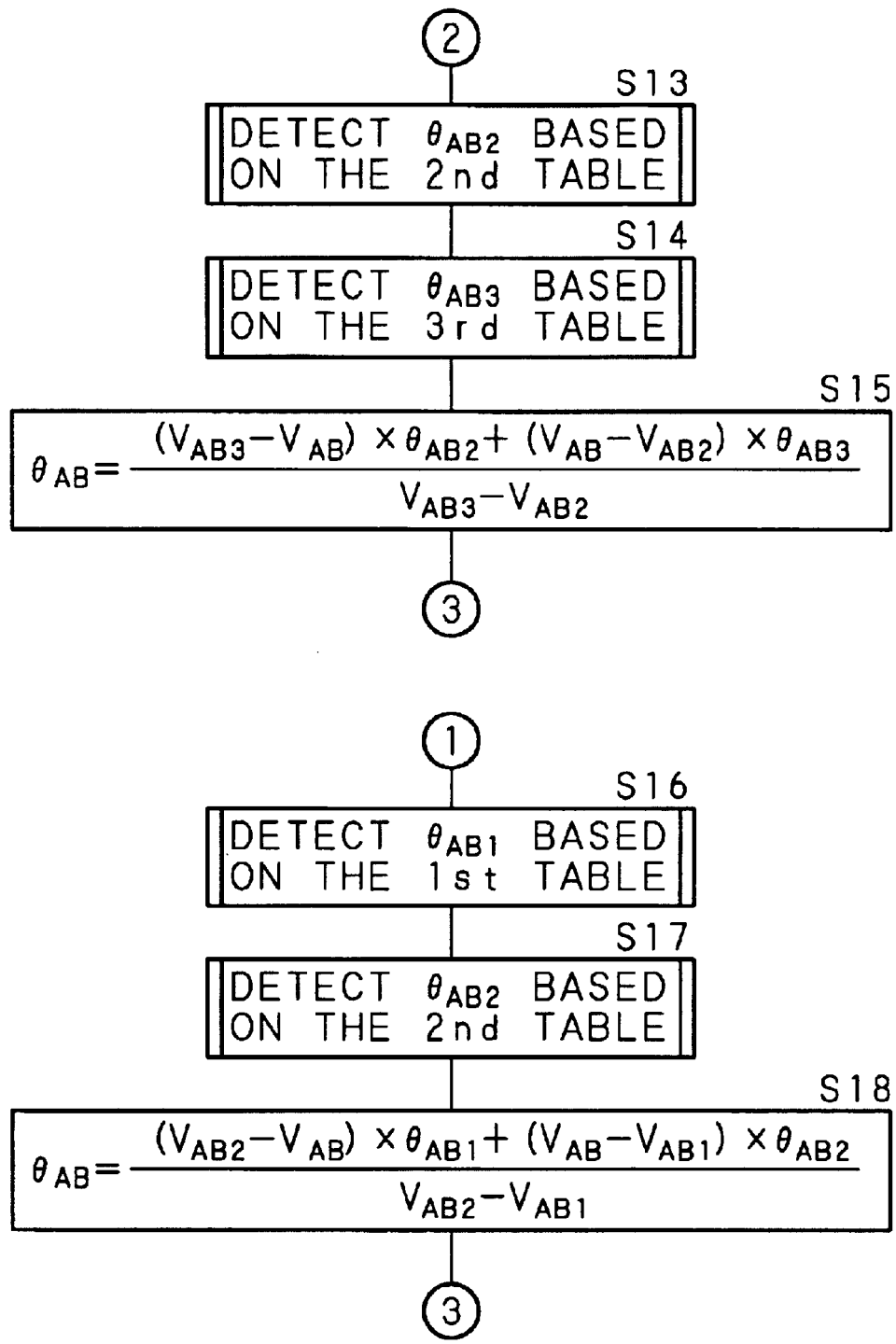
FIG. 6 is a flowchart showing the operation of the calculation processing circuit of the electric power steering apparatus.
Figure 8:
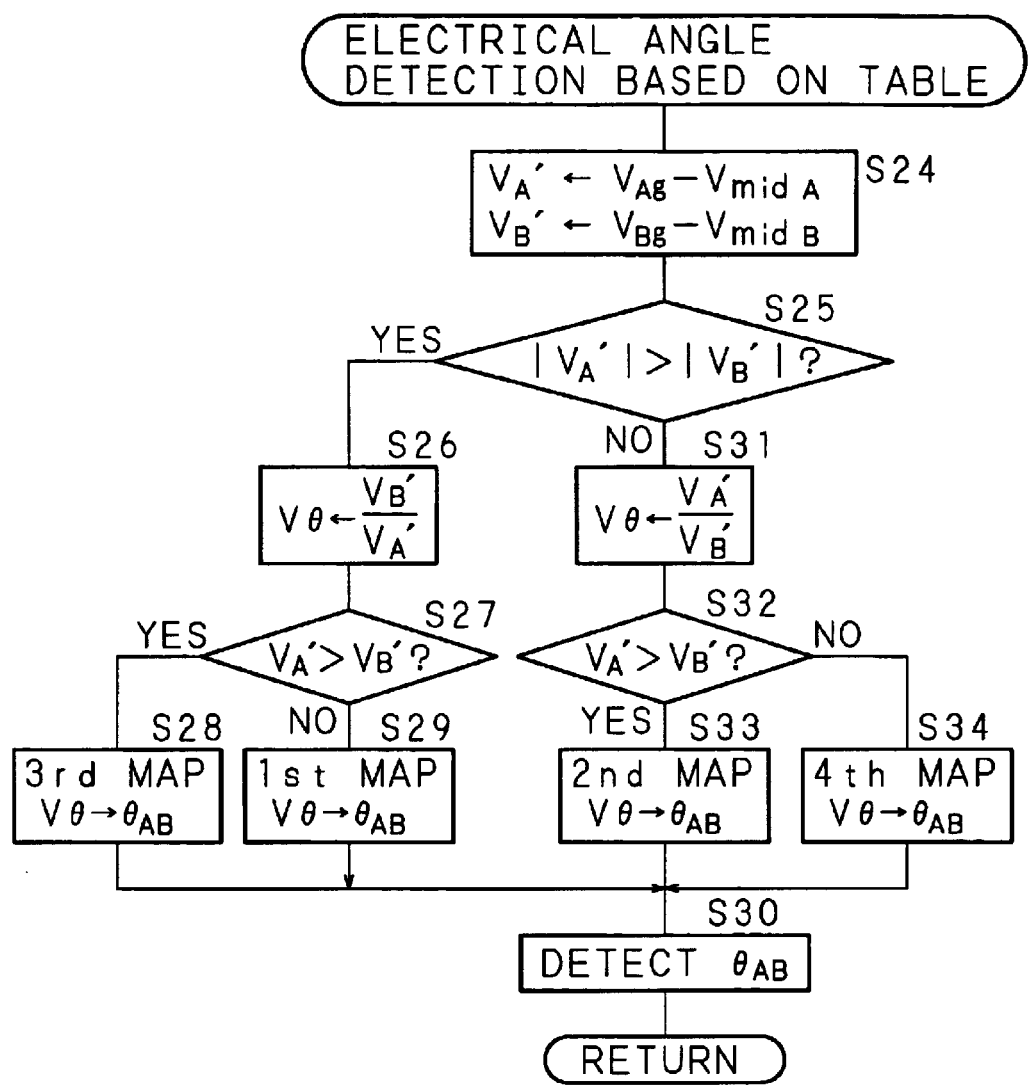
FIG. 8 is a flowchart showing the operation of the calculation processing circuit of the electric power steering apparatus.

FIG. 5, FIG. 6 and FIG. 8 are flowcharts showing the operation of calculating the electrical angle of the respective detection signals of the magnetic sensors A and B by using the first table 2a through third table 2c. These flowcharts can be applied to the operation of calculating the electrical angle of the respective detection signals of the magnetic sensors E, F and the magnetic sensors C, D (in this case, the 5th through 8th maps are used).

First, the calculation processing circuit 10 reads detection signals $V_A$ and $V_B$ of the magnetic sensors A and B by converting them into digital signals (step S1). Next, the calculation processing circuit 10 executes a routine of learning and calculating the p-p value $V_{PP}$ (peak-to-peak value) and the mid value $V_{mid}$ of each detection signal and performs a collection operation so that the p-p value $V_{PP}$ and the mid value $V_{mid}$ become fixed reference values (for example, $V_{mid}$=2.5 V, $V_{PP}$=4.0 V) (step S2), and then performs a return if the mid values $V_{midA}$ and $V_{midB}$ of the respective detection signals are not calculated (NO in step S3).

If the mid values $V_{midA}$ and $V_{midB}$ of the respective detection signals are calculated (YES in step S3), the calculation processing circuit 10 determines whether or not the intersection of detection signals $V_{Ag}$ and $V_{Bg}$ obtained by the correction operation of the detection signals $V_A$ and $V_B$ (step S2) (the intersection of the AB phases) is detected (step S5). If detected (YES in step S5), the calculation processing circuit 10 defines the average voltage of the detection signals $V_{Ag}$ and $V_{Bg}$ as the intersection voltage $V_{AB}$ (step S6), and updates the intersection voltage $V_{AB}$ (step S7).

Next, the calculation processing circuit 10 determines whether the intersection voltage $V_{AB}$ is equal to or higher than an intersection voltage $V_{AB2}$ of the 2nd table 2b (step S8).

If the intersection of the detection signals $V_{Ag}$ and $V_{Bg}$ (intersection of the AB phases) is not detected (NO in step S5), the calculation processing circuit 10 determines whether the latest intersection voltage $V_{AB}$ detected in the previous sampling cycle (the intersection voltage $V_{AB}$ that is not updated in step S7) is equal to or higher than the intersection voltage $V_{AB2}$ of the 2nd table 2b (step S8).

Figure 7A:
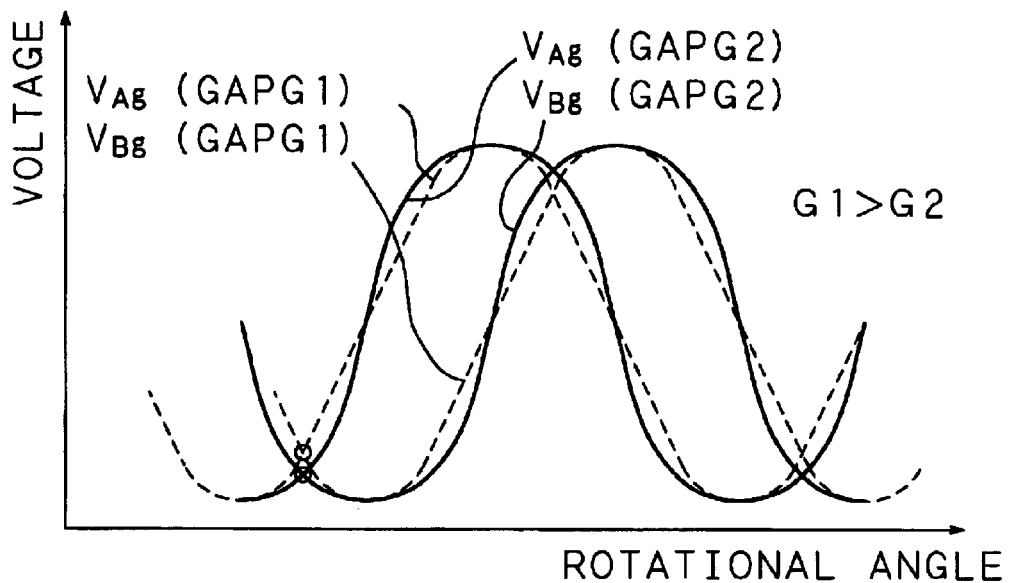
FIG. 7A and FIG. 7B are explanatory views showing an example of the relationship between the intersection voltage of the detection signals and the gap between the target and magnetic sensor.
Figure 7B:
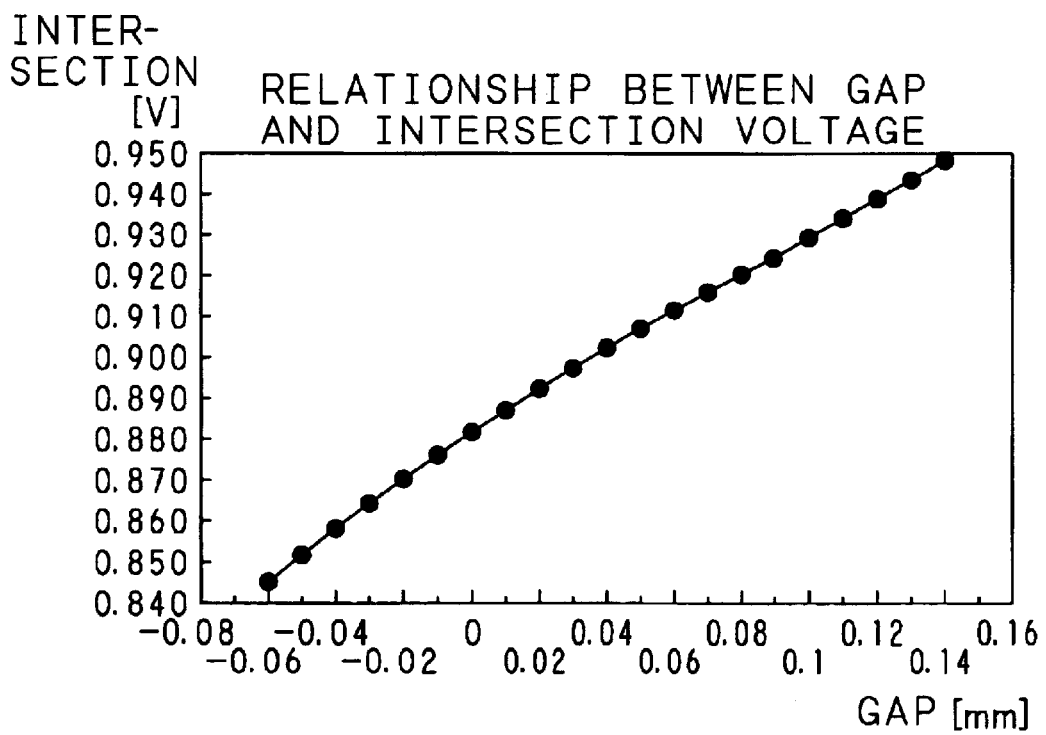

As shown in FIG. 7A, the intersection voltage $V_{AB}$ of the detection signals $V_{Ag}$ and $V_{Bg}$ changes according to gaps G1 and G2 between the target 3a and the magnetic sensors A, B, and the larger the gap, the higher the intersection voltage. This relationship is a substantially proportional relationship as shown in FIG. 7B. In FIG. 7B, the gap is shown by a deviation from a mounting reference value (for example, 0.50 mm). Here, although the case where the intersection voltage $V_{AB}$ of the detection signals $V_{Ag}$ and $V_{Bg}$ is lower than the mid values of the detection signals $V_{Ag}$ and $V_{Bg}$ is illustrated, the same can also be said for the case where the intersection voltage $V_{AB}$ is higher than the mid values of the detection signals $V_{Ag}$ and $V_{Bg}$. However, the larger the gap, the lower the intersection voltage will be.

Here, the 1st table 2a shows the case where the gap is 0.40 mm and the intersection voltage $V_{AB}$ is 0.85 V, the 2nd table 2b shows the case where the gap is 0.50 mm and the intersection voltage $V_{AB}$ is 0.90 V, and the 3rd table 2c shows the case where the gap is 0.60 mm and the intersection voltage $V_{AB}$ is 0.95 V Next, if the intersection voltage $V_{AB}$ is equal to or higher than the intersection voltage $V_{AB2}$ of the 2nd table 2b (YES in step S8), the calculation processing circuit 10 determines whether the intersection voltage $V_{AB}$ is equal to or higher than an intersection voltage $V_{AB3}$ of the 3rd table 2c (step S9).

If the intersection voltage $V_{AB}$ is equal to or higher than the intersection voltage $V_{AB3}$ of the 3rd table 2c (YES in step S9), the calculation processing circuit 10 determines the intersection voltage $V_{AB3}$ of the 3rd table 2c to be an intersection voltage closest to the voltage $V_{AB}$, and detects the electrical angle $\theta_{AB}$ based on the 3rd table 2c (step S10).

If the intersection voltage $V_{AB}$ is less than the intersection voltage $V_{AB2}$ of the 2nd table 2b (NO in step S8), the calculation processing circuit 10 determines whether the intersection voltage $V_{AB}$ is equal to or higher than an intersection voltage $V_{AB1}$ of the 1st table 2a (step S11).

If the intersection voltage $V_{AB}$ is not equal to or higher than the intersection voltage $V_{AB1}$ of the 1st table 2a (NO in step S11), the calculation processing circuit 10 determines the intersection voltage $V_{AB1}$ of the 1st table 2a to be an intersection voltage closest to the voltage $V_{AB}$, and detects the electrical angle $\theta_{AB}$ based on the 1st table 2a (step S12).

In the case where the electrical angle $\theta_{AB}$ is detected based on the 1st table 2a (step S12), the calculation processing circuit 10 calculates $V_A'=V_{Ag}-V_{midA}$ and $V_B'=V_{Bg}-V_{midB}$ by using the mid values $V_{midA}$ and $V_{midB}$ of the respective detection signals obtained by the learning routine (step S2), and converts the detection signals $V_{Ag}$ and $V_{Bg}$ into detection signals $V_A'$ and $V_B'$ corresponding to the mid value of 0 (step S24 in FIG. 8).

Next, the calculation processing circuit 10 compares the magnitude of the absolute values $|V_A'|$ and $|V_B'|$ of the detection signals $V_A'$ and $V_B'$ (step S25). When $|V_A'|$ is larger than $|V_B'|$ (YES in step S25), the calculation processing circuit 10 executes a predetermined operation $V\theta=V_A'/V_B'$ (step S26).

Figure 9:
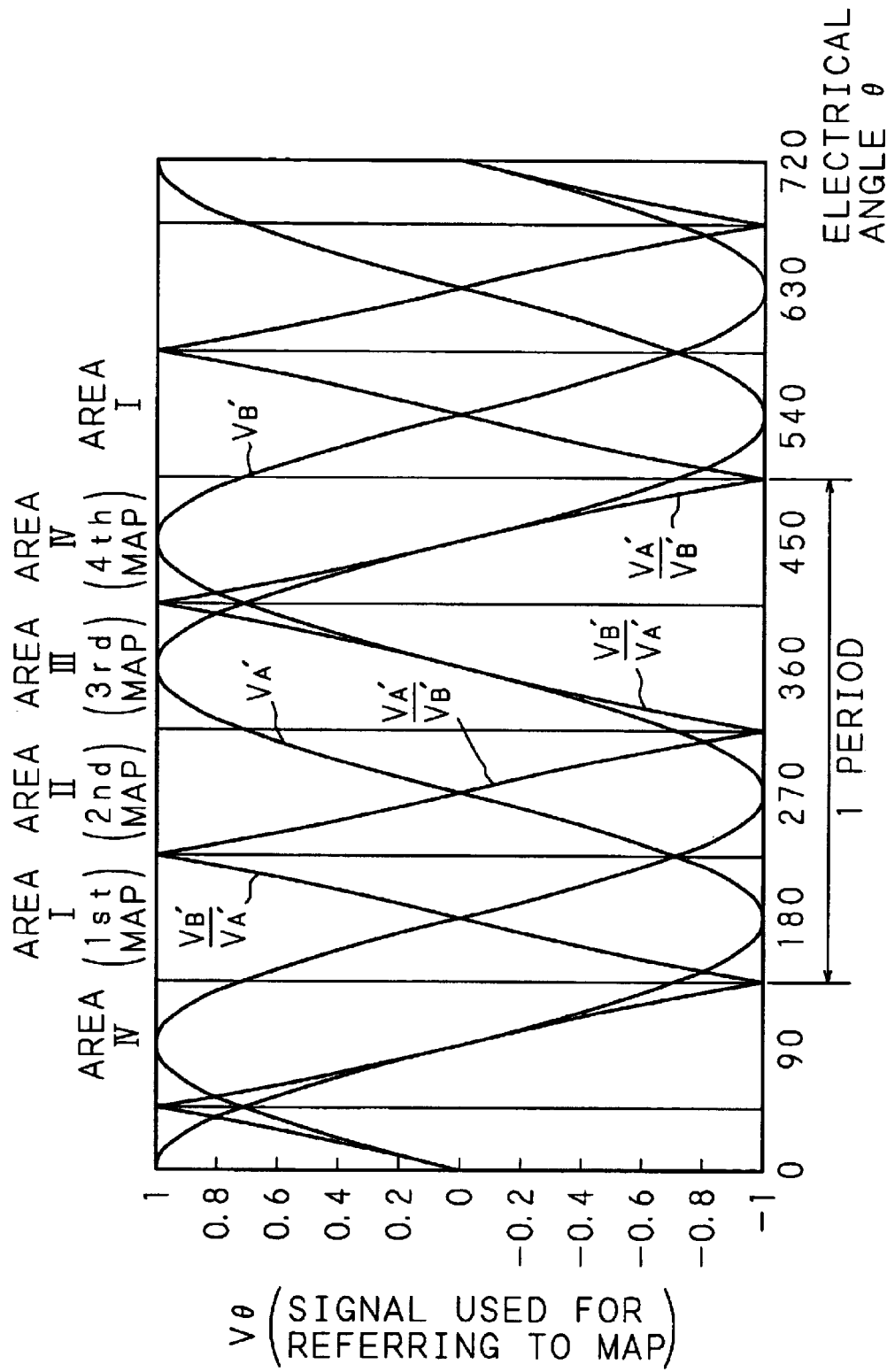
FIG. 9 is an explanatory view showing the relationship between the waveforms of detection signals $V_A'$ and $V_B'$ and the 1st map through 4th map.

Here, in FIG. 9 showing the relationship between the waveforms of the detection signals $V_A'$ and $V_B'$ and the 1st map 5aa through 4th map 5ad, the region where $|V_A'|$ is larger than $|V_B'|$ is region I and region III.

Next, the calculation processing circuit 10 compares the magnitude of the detection signals $V_A'$ and $V_B'$, and determines which of the region I and region III is the region where the detection signals $V_A'$ and $V_B'$ are present (step S27).

When $V_A'$ is larger than $V_B'$ (YES in step S27), the calculation processing circuit 10 determines that detection signals $V_A'$ and $V_B'$, are present in the region III, searches for the electrical angle $\theta_{AB}$ of the detection signal $V_A'$ corresponding to $V\theta$ with reference to the 3rd map 5ac storing the relationship between $V\theta=V_B'/V_A'$ (step S26) and the electrical angle $\theta$ of the detection signal $V_A'$ in the region III according to $V\theta=V_A'/V_B'$ (step S28), and detects the electrical angle $\theta_{AB}$ (step S30) and then performs a return.

It may be possible to detect the electrical angle $\theta$ of the detection signal $V_B'$ instead of the electrical angle $\theta$ of the detection signal $V_A'$ if the phase (at the mid point of steering angle) of the magnetic sensor for use in torque calculation or steering angle calculation is the same. More specifically, when detecting the electrical angle $\theta$ of the detection signal $V_A'$, the electrical angle $\theta$ of the detection signal $V_E'$ is detected, whereas, when detecting the electrical angle $\theta$ of the detection signal $V_B'$, the electrical angle $\theta$ of the detection signal $V_F'$ is detected. There is no problem even when the electrical angles $\theta$ of the detection signals $V_A'$ and $V_B'$ and the electrical angles $\theta$ of the detection signals $V_E'$ and $V_F'$ are detected without distinguishing them.

When $V_B'$ is larger than $V_A'$ (NO in step S27), the calculation processing circuit 10 determines that detection signals $V_A'$ and $V_B'$, are present in the region I, searches for the electrical angle $\theta_{AB}$ of the detection signals $V_A'$ and $V_B'$ corresponding to $V\theta$ with reference to the 1st map 5aa storing the relationship between $V\theta=V_B'/V_A'$ (step S26) and the electrical angle $\theta$ of the detection signals $V_A'$, $V_B'$ (electrical angle $\theta$ of the detection signal $V_A'$) in the region I according to $V\theta=V_B'/V_A'$ (step S29), and detects the electrical angle $\theta_{AB}$ (step S30) and then performs a return.

The calculation processing circuit 10 compares the magnitude of the absolute values $|V_A'|$ and $|V_B'|$ of the detection signals $V_A'$ and $V_B'$ (step S25). When $|V_B'|$ is larger than $|V_A'|$ (NO in step S25), the calculation processing circuit 10 executes a predetermined operation $V\theta=V_A'/V_B'$ (step S31).

Here, as shown in FIG. 9, the region where $|V_B'|$ is larger than $|V_A'|$ is region II and region IV.

By executing the predetermined operation $V\theta=V_B'/V_A'$ (step S26) when $|V_A'|$ is larger than $|V_B'|$, or executing the predetermined operation $V\theta=V_A'/V_B'$ (step S31) when $|V_B'|$ is larger than $|V_A'|$, it is possible to adjust $V\theta$ within a range of −1 to +1, shorten the map reference time, and reduce the volume of data of the map.

Next, the calculation processing circuit 10 compares the magnitude of the detection signals $V_A'$ and $V_B'$, and determines which of the region II and region IV is the region where the detection signals $V_A'$ and $V_B'$ are present (step S32).

When $V_A'$ is larger than $V_B'$ (YES in step S32), the calculation processing circuit 10 determines that detection signals $V_A'$ and $V_B'$, are present in the region II, searches for the electrical angle $\theta_{AB}$ of the detection signals $V_A'$, $V_B'$ corresponding to $V\theta$ with reference to the 2nd map 5ab storing the relationship between $V\theta=V_A'/V_B'$ (step S31) and the electrical angle $\theta$ of the detection signal $V_A'$, $V_B'$ in the region II according to $V\theta=V_A'/V_B'$ (step S33), and detects the electrical angle $\theta_{AB}$ (step S30) and then performs a return.

When $V_B'$ is larger than $V_A'$ (NO in step S32), the calculation processing circuit 10 determines that detection signals $V_A'$ and $V_B'$, are present in the region IV, searches for the electrical angle $\theta_{AB}$ of the detection signals $V_A'$, $V_B'$ corresponding to V$\theta$ with reference to the 4th map 5ad storing the relationship between V$\theta$=$V_A'/V_B'$ (step S31) and the electrical angle $\theta$ of the detection signal $V_A'$, $V_B'$ in the region IV according to V$\theta$=$V_A'/V_B'$ (step S34), and detects the electrical angle $\theta_{AB}$ (step S30) and then performs a return.

As shown in FIG. 9, in the ideal case, since the 1st map 5aa through 4th map 5ad mutually show symmetry, if the variation in the values of the detection signals $V_A'$ and $V_B'$ actually measured in advance is small, it is possible to reduce the kinds of maps.

According to this electrical angle detection method, since the maps based on actually measured values are used, it is possible to correct the distortion of individual magnetic sensors and targets.

Although $V_A'/V_B'$, $V_B'/V_A'$ are used as the predetermined operations, the predetermined operations are not limited to them and may be any other operations, for example, a combination of four fundamental rules of arithmetic, such as $(V_A'-V_B')/(V_A'+V_B')$, $(V_A'+V_B')/(V_A'-V_B')$.

The above-mentioned flowchart showing the operation of detecting the electrical angle $\theta_{AB}$ based on the 1st table 2a (steps S25 through S34 in FIG. 8) can similarly be applied to the detection of the electrical angle $\theta_{AB}$ based on the 3rd table 2c (step S10) and the detection of the electrical angle $\theta_{AB}$ based on the 2nd table 2b.

In FIG. 5, if the intersection voltage $V_{AB}$ is not equal to or higher than the intersection voltage $V_{AB3}$ of the 3rd table 2c (NO in step S9), the calculation processing circuit 10 detects an electrical angle $\theta_{AB2}$ corresponding to the detection signals $V_A'$ and $V_B'$ based on the 2nd table 2b (step S13 in FIG. 6), and then detects an electrical angle $\theta_{AB3}$ corresponding to the detection signals $V_A'$ and $V_B'$ based on the 3rd table 2c (step S14).

Next, the calculation processing circuit 10 calculates the electrical angle $\theta_{AB}$ of the detection signals $V_A'$ and $V_B'$ by interpolating the electrical angle between the electrical angles $\theta_{AB2}$ and $\theta_{AB3}$ by the following equation using the intersection voltage $V_{AB}$, the intersection voltage VAB$_2$ of the 2nd table 2b, the intersection voltage $V_{AB3}$ of the 3rd table 2c, the electrical angle $\theta_{AB2}$ detected based on the 2nd table 2b, and the electrical angle $\theta_{AB3}$ detected based on the 3rd table 2c, (step S15), and performs a return.

$$\theta_{AB}=((V_{AB3}-V_{AB})\times\theta_{AB2}+((V_{AB}-V_{AB2})\times\theta_{AB3})/(V_{AB3}-V_{AB2})$$

It was found by experiments that, even when the electrical angle for an intersection voltage (gap) between the intersection voltages (gaps) of two tables is calculated by interpolation based on the electrical angles detected by the two tables, large errors will not occur.

If the intersection voltage $V_{AB}$ is equal to or higher than the intersection voltage $V_{AB1}$ of the 1st table 2a (YES in step S11), the calculation processing circuit 10 detects the electrical angle $\theta_{AB1}$ corresponding to the detection signals $V_A'$ and $V_B'$ based on the 1st table 2a (step S16 in FIG. 6), and then detects the electrical angle $\theta_{AB2}$ corresponding to the detection signals $V_A'$ and $V_B'$ based on the 2nd table 2b (step S17).

Next, the calculation processing circuit 10 calculates the electrical angle $\theta_{AB}$ of the detection signals $V_A'$ and $V_B'$ by interpolating the electrical angle between the electrical angles $\theta_{AB1}$ and $\theta_{AB2}$ by the following equation using the intersection voltage $V_{AB}$, the intersection voltage $V_{AB1}$ of the 1st table 2a, the intersection voltage $V_{AB2}$ of the 2nd table 2b, the electrical angle $\theta_{AB1}$ detected based on the 1st table 2a, and the electrical angle $\theta_{AB2}$ detected based on the 2nd table 2b (step S18), and performs a return.

$$\theta_{AB}=((V_{AB2}-V_{AB})\times\theta_{AB1}+(V_{AB}-V_{AB1})\times\theta_{AB2})/(V_{AB2}-V_{AB1})$$

Figure 10:
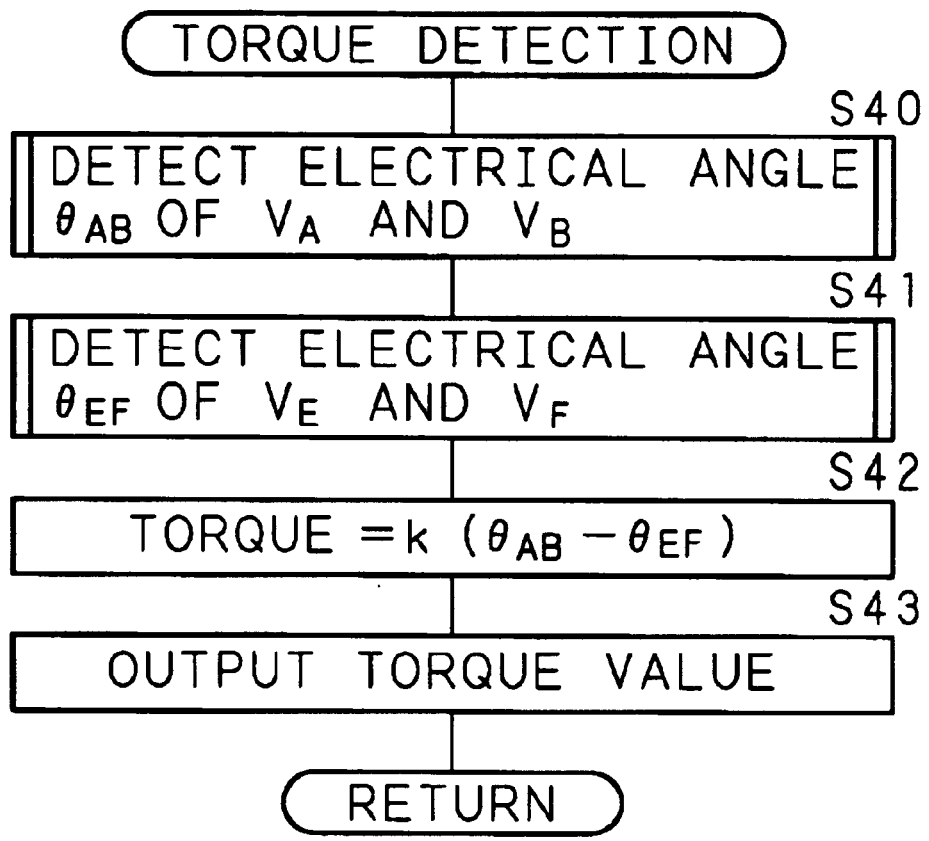
FIG. 10 is a flowchart showing the operation of the calculation processing circuit of the electric power steering apparatus.

FIG. 10 is a flowchart showing the operation of detecting a torque using the 1st map 5a through 4th map 5d (1st map 5aa through 4th map 5ad, 1st map 5ba through 4th map 5bd, or 1st map 5ca through 4th map 5cd).

First, according to the above-mentioned flowcharts of FIG. 5, FIG. 6 and FIG. 8, the calculation processing circuit 10 detects the electrical angle $\theta_{AB}$ of he detection signals $V_A$ and $V_B$ of the magnetic sensors A and B (step S40), and then detects the electrical angle $\theta_{EF}$ of the detection signals $V_E$ and $V_F$ of the magnetic sensors E and F in the same manner (step S41).

The calculation processing circuit 10 calculates the torque by operating torque=k($\theta_{AB2}-\theta_{EF}$) (k is the spring constant of the torsion bar 9) (step S42), outputs the calculated torque value (step S43), and then performs a return.

Figure 11:
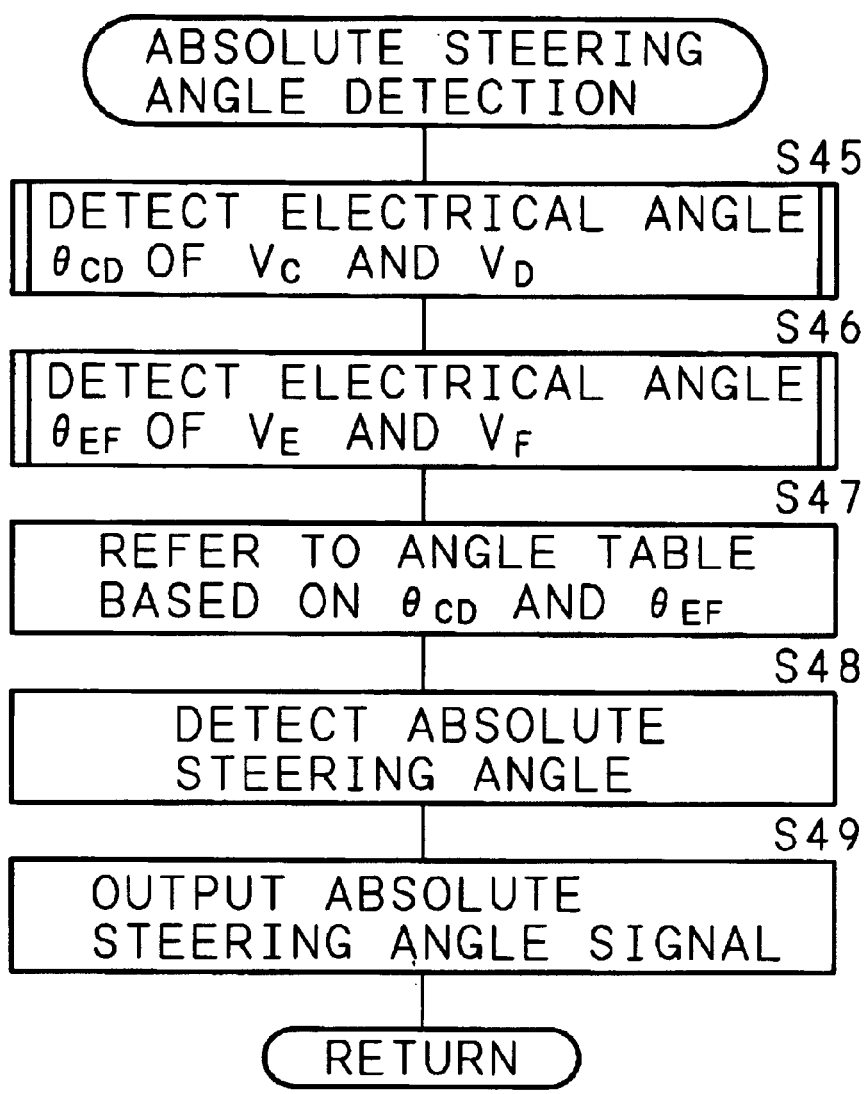
FIG. 11 is a flowchart showing the operation of the calculation processing circuit of the electric power steering apparatus.

FIG. 11 is a flowchart showing the operation of detecting an absolute steering angle using the 1st map 5a through 8th map 5h (1st map 5aa through 8th map 5ah, 1st map 5ba through 8th map 5bh, or 1st map 5ca through 8th map 5ch).

First, according to the above-mentioned flowcharts of FIG. 5, FIG. 6 and FIG. 8, the calculation processing circuit 10 detects the electrical angle $\theta_{CD}$ of he detection signals $V_C$ and $V_D$ of the magnetic sensors C and D using the 5th map 5e through 8th map 5h (step S45), and then detects the electrical angle $\theta_{EF}$ of the detection signals $V_E$ and $V_F$ of the magnetic sensors E and F in the same manner using the 1st map 5a through 4th map 5d (step S46).

Next, the calculation processing circuit 10 refers to the angle table 14 based on the electrical angles $\theta_{CD}$ and $\theta_{EF}$ (step S47), detects an absolute steering angle corresponding to the electrical angles $\theta_{CD}$ and $\theta_{EF}$ (step S48), and outputs the detected absolute steering angle signal (step S49) and then performs a return.

It is possible to obtain the same effects by getting conversion formulas representing the relationship between the results of predetermined operation executed on the respective detection signals of the magnetic sensors A, B, C, D actually measured in advance, such as at the time of shipment from the factory, and the electrical angle of the respective detection signals for each gap and by using converting means having these conversion formulas instead of the above-mentioned 1st table 2a, 2nd table 2b, and 3rd table 2c.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A rotational angle detecting apparatus comprising:
   a plurality of detecting means, disposed respectively to face a target made of a magnetic material and provided on a rotating member, for detecting the target and outputting detection signals having phases according to the position of the target which changes with a rotation of the rotating member;

operating means for operating a predetermined operation on the detection signals respectively outputted from the detecting means;

converting means for converting a result of the operation operated by the operating means into the electrical angle of the detection signals based on ones of a plurality of tables and a plurality of conversion formulas, said tables representing the correlation of each operation result obtained by operating the predetermined operation by the operating means in advance for different gaps between the target and the detecting means with a corresponding electrical angle of the detection signals, and said conversion formulas representing the relationship between the operation result and the electrical angle of the detection signals for different gaps between the target and the detecting means; and determining means for determining the gap based on the detection signals respectively outputted from the detecting means, wherein the converting means converts the result of the operation operated by the operating means into the electrical angle of the detection signals based on one of the table and the conversion formula corresponding to the gap determined by the determining means, and detects a rotational angle of the rotating member based on the obtained electrical angle.

2. The rotational angle detecting apparatus according to claim 1, comprising:

means for determining whether or not the gap determined by the determining means is one of the gaps corresponding to ones of a plurality of the tables and a plurality of the conversion formulas; and calculating means for calculating the electrical angle of the detection signals by interpolation based on ones of two tables and two conversion formulas corresponding to two gaps on both sides of the gap determined by the determining means, if the determination result by the means is negative.

3. The rotational angle detecting apparatus according to claim 2, wherein the calculating means calculates the electrical angle of the detection signals based on the operation results obtained by operating the predetermined operation by the operating means in advance for two gaps on both sides of the gap determined by the determining means, the electrical angles of the detection signals obtained by converting the operation results by converting means, and the result of the operation operated the predetermined operation on the detection signals respectively outputted from the detecting means by the operating means.

4. A rotational angle detecting apparatus comprising:

a plurality of detectors, disposed respectively to face a target made of a magnetic material and provided on a rotating member, for detecting the target and outputting detection signals having phases according to the position of the target which changes with a rotation of the rotating member; and a controller capable of performing operations of executing a predetermined operation on the detection signals respectively outputted from the detectors;

storing ones of a plurality of tables and a plurality of conversion formulas, said tables representing the correlation of each operation result obtained by executing the predetermined operation in advance for different gaps between the target and the detectors with a corresponding electrical angle of the detection signals, said conversion formulas representing the relationship between the operation result and the electrical angle of the detection signals for different gaps between the target and the detectors;

determining the gap based on the detection signals respectively outputted from the detectors;

converting the result of the executed operation into the electrical angle of the detection signals based on one of the table and the conversion formula corresponding to the determined gap; and detecting a rotational angle of the rotating member based on the obtained electrical angle.

5. The rotational angle detecting apparatus according to claim 4, wherein the controller determines whether or not the determined gap is one of the gaps corresponding to ones of a plurality of the tables and a plurality of the conversion formulas, and calculates the electrical angle of the detection signals by interpolation based on ones of two tables and two conversion formulas corresponding to two gaps on both sides of the determined gap, if the determination result is negative.

6. The rotational angle detecting apparatus according to claim 5, wherein the controller calculates the electrical angle of the detection signals based on the operation results obtained by executing the predetermined operation in advance for the two gaps on both sides of the determined gap, the electrical angles of the detection signals obtained by converting the operation results, and the result of the operation executed the predetermined operation on the detection signals respectively outputted from the detectors.

7. A torque detecting apparatus comprising:

the rotational angle detecting apparatus as set forth in claim 1 provided for each of a first shaft and a second shaft connected by a connection shaft; and detecting means for detecting a torque applied to one of the first shaft and the second shaft based on rotational angles of the first shaft and the second shaft detected by the rotational angle detecting apparatuses provided for the first shaft and the second shaft, respectively.

8. A torque detecting apparatus comprising:

the rotational angle detecting apparatus as set forth in claim 2 provided for each of a first shaft and a second shaft connected by a connection shaft; and detecting means for detecting a torque applied to one of the first shaft and the second shaft based on rotational angles of the first shaft and the second shaft detected by the rotational angle detecting apparatuses provided for the first shaft and the second shaft, respectively.

9. A torque detecting apparatus comprising:

the rotational angle detecting apparatus as set forth in claim 3 provided for each of a first shaft and a second shaft connected by a connection shaft; and detecting means for detecting a torque applied to one of the first shaft and the second shaft based on rotational angles of the first shaft and the second shaft detected by the rotational angle detecting apparatuses provided for the first shaft and the second shaft, respectively.

10. A torque detecting apparatus comprising:

the rotational angle detecting apparatus as set forth in claim 4 provided for each of a first shaft and a second shaft connected by a connection shaft; and a controller capable of performing operations of detecting a torque applied to one of the first shaft and the second shaft based on rotational angles of the first shaft and the second shaft detected by the rotational angle detecting apparatuses provided for the first shaft and the second shaft, respectively.

11. A torque detecting apparatus comprising:

the rotational angle detecting apparatus as set forth in claim 5 provided for each of a first shaft and a second shaft connected by a connection shaft; and a controller capable of performing operations of detecting a torque applied to one of the first shaft and the second shaft based on rotational angles of the first shaft and the second shaft detected by the rotational angle detecting apparatuses provided for the first shaft and the second shaft, respectively.

12. A torque detecting apparatus comprising:

the rotational angle detecting apparatus as set forth in claim 6 provided for each of a first shaft and a second shaft connected by a connection shaft; and a controller capable of performing operations of detecting a torque applied to one of the first shaft and the second shaft based on rotational angles of the first shaft and the second shaft detected by the rotational angle detecting apparatuses provided for the first shaft and the second shaft, respectively.

13. A method of detecting a rotation angle of a rotating member supporting a magnetic target comprising the steps of:

providing first and second detectors facing the target and spaced from the target by a gap;

detecting the target and outputting first and second detection signals having phases related to the relative positions of the first and second detectors and the target;

performing a predetermined operation on the first and second detection signals and obtaining a given operation result; providing either:

a first table including, for a first gap, correlations between operation results obtained in advance for various positions of the target and electrical angles of the detection signals, and a second table including, for a second gap, correlations between operation results obtained in advance for various positions of the target and electrical angles of the detection signals; or first and second conversion formulas representing the relationship between operation results obtained in advance for various positions of the target and the electrical angle of the detection signals for first and second gaps;

converting the given operation result into an electrical angle based on the first and second tables or the first and second of conversion formulas; and determining a rotational angle of the rotating member based on the obtained electrical angle.

14. The method of claim 13 including the additional step of determining the size of the gap based on the first and second detection signals.

15. The method of claim 14 wherein said step of converting the given operation result into an electrical angle based on the first and second tables or the first and second of conversion formulas comprises the step of interpolating an electrical angle from electrical angles in the first and second tables.

16. A rotational angle detecting apparatus comprising:

first and second detectors disposed adjacent a magnetic target on a rotating member, said first and second detectors outputting first and second detection signals having phases related to the position of the target with respect to the first and second detectors;

an operating circuit for performing a predetermined operation on the first and second detection signals and producing an operation result;

a converting circuit for converting the operation result into an electrical angle based on a first table including, for a first gap, correlations between operation results obtained in advance for various positions of the target and electrical angles of the detection signals, and a second table including, for a second gap, correlations between operation results obtained in advance for various positions of the target and electrical angles of the detection signals or based on first and second conversion formulas representing the relationship between operation results obtained in advance for various positions of the target and the electrical angle of the detection signals for first and second gaps; and a determining circuit for determining a gap between the target and the first and second detectors based on the detection signals outputted from the first and second detectors, wherein the converting circuit converts an operation result into an electrical angle based on the first and second tables or the first and second conversion formulas and determines a rotational angle of the rotating member based on the obtained electrical angle.

* * * * *